United States Patent [19]

Fromme

[11] Patent Number: 5,157,846
[45] Date of Patent: Oct. 27, 1992

[54] SCALE

[75] Inventor: Hartmut Fromme, Chieming/Hart, Fed. Rep. of Germany

[73] Assignee: Dr. Johannes Heidenhain GmbH, Traunreut, Fed. Rep. of Germany

[21] Appl. No.: 728,106

[22] Filed: Jul. 10, 1991

[30] Foreign Application Priority Data

Jul. 10, 1990 [DE] Fed. Rep. of Germany ....... 4021919

[51] Int. Cl.⁵ .......................................... G01B 11/04
[52] U.S. Cl. .................................... 33/700; 33/704
[58] Field of Search ............... 33/707, 706, 708, 703, 33/702, 700, 701; 156/257, 258, 304.5

[56] References Cited

U.S. PATENT DOCUMENTS

| | | | |
|---|---|---|---|
| 1,148,584 | 8/1915 | Gerrish | 156/258 |
| 4,086,382 | 4/1978 | Hites | 156/257 X |
| 4,400,880 | 8/1983 | Nelle | 33/706 |
| 4,600,203 | 7/1986 | Miller et al. | 33/706 X |

FOREIGN PATENT DOCUMENTS

| | | |
|---|---|---|
| 2505587 | 8/1976 | Fed. Rep. of Germany . |
| 2643304 | 4/1978 | Fed. Rep. of Germany . |
| 2841501 | 3/1980 | Fed. Rep. of Germany . |
| 8911313 | 12/1989 | Fed. Rep. of Germany . |

Primary Examiner—Harry N. Haroian
Attorney, Agent, or Firm—Anderson Kill Olick & Oshinsky

[57] ABSTRACT

A scale, particularly for a position measuring device, includes a base member and a graduation carrier with a graduation which is fastened with an adhesive layer to the base member. In order to prevent an at least partial separation of the adhesive layer from the contact surface of the base member, the adhesive layer extends in a positively engaging manner with a projection in a dovetail-shaped groove in the contact surface of the base member, so that a secure adhesion of the adhesive layer on the contact surface of the base member is ensured.

15 Claims, 1 Drawing Sheet

SCALE

BACKGROUND OF THE INVENTION

1. Field of the Invention

The present invention relates to a scale, particularly for a position measuring device. The scale includes a base member which is fastened by means of an adhesive layer to a graduation carrier with a graduation.

2. Description of the Related Art

A scale of the above-described type is used particularly in a position measuring device for measuring the relative positions of two objects, for example, two machine components of a processing machine.

German patent 25 05 587 describes a length measuring device in which a graduation carrier is fastened to a housing as the base member without direct contact by means of an elastic adhesive layer, so that measuring inaccuracies are avoided when the base member and the graduation carrier have different thermal coefficients of expansion.

German Utility Model 89 11 313 describes a scale in which a graduation carrier of glass is fastened on a base member of steel by means of a thin inelastic adhesive layer of a hard adhesive, so that the behavior of the base member of steel in the case of temperature changes is imparted through the thin layer of hard adhesive to the graduation carrier of glass and, consequently, the behavior of the scale in the case of temperature changes corresponds approximately to the behavior of the machine part of steel to which it is fastened. The surface of the base member and/or the surface of the graduation carrier which come into contact with the adhesive have recesses for receiving the excessive hard adhesive during the gluing procedure, so that a layer of hard adhesive is obtained which is as thin as possible and transmits as much force as possible.

German Auslegeschrift 26 43 304 describes a length measuring device in which a graduation carrier rests on the edges of a rectangular groove of a housing as the base member, wherein the groove extends in the measuring direction. The graduation carrier is connected to the base member in the middle of the graduation carrier by means of an inelastic adhesive in the groove and on both sides by means of a highly elastic adhesive in the groove, so that a thermal expansion is obtained which is independent of the base member and is uniform from the middle, whereby the middle of the graduation carrier maintains its position unchanged relative to the base member.

The adhesion of the adhesive layer to the surfaces of the base member and/or of the graduation carrier is more or less satisfactory depending on the surface properties and the manner in which the surfaces have been cleaned, so that the adhesive layer may be at least partially separated from the surfaces of the base member and/or of the graduation carrier and, consequently, the planeness of the graduation surface of the graduation carrier is impaired and the scanning graduation surface of the scanning unit is changed, which may lead to measuring inaccuracies and to problems in operation.

SUMMARY OF THE INVENTION

Therefore, it is the object of the present invention to provide a scale of the above-described type in which a secure adhesion of the adhesive layer to the surfaces of the base member and/or the graduation carrier is ensured.

In accordance with the present invention, the adhesive layer is fastened in a positively engaging manner to the base member and/or to the graduation carrier in order to avoid separation.

The features of the present invention provide the particular advantage that the proposed positively engaging fastening of the adhesive layer to the surfaces of the base member and/or the graduation carrier safely avoids the separation, so that any measuring inaccuracies due to the separation can be prevented.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
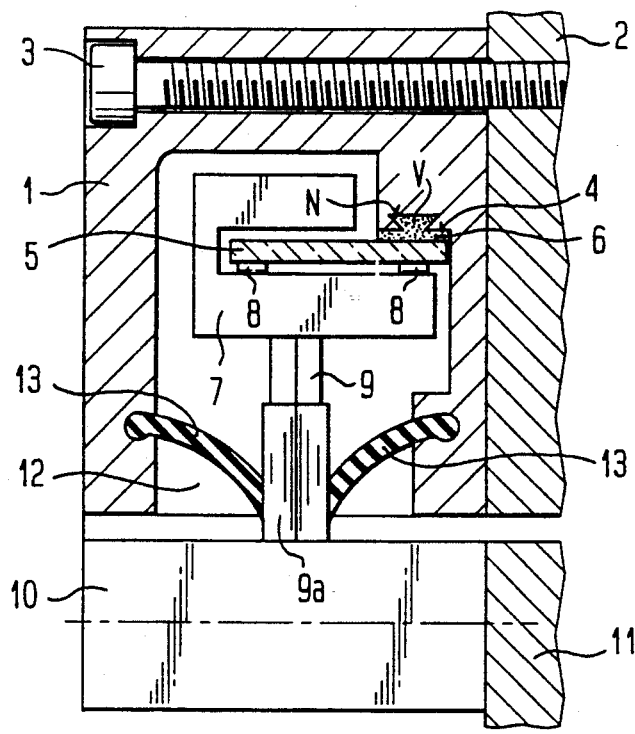
FIG. 1 is a cross-sectional view of an enclosed length measuring device.

FIG. 1 of the drawing is a cross-sectional view of an enclosed length measuring device for measuring the relative position of two objects. The length measuring device has a housing 1 as the base member which is connected to an object 2 by means of screws 3. In the interior of the housing 1, a graduation carrier 5 is fastened by means of an adhesive layer 6 to a contact surface 4. A scanning unit 7 for scanning the graduation of the graduation carrier 5 is guided on the plane of the graduation by means of rollers 8 and is connected to a drive member 9 through a coupling, not shown. The drive member 9 is fastened through a mounting element 10 to the second object 11. The housing 1 has in measuring direction a longitudinal slot 12 which is closed by two roof-shaped inclined sealing lips 13 through which the drive member 9 extends with a double sword-shaped part 9a. The two objects 2, 11 may be two machine components of a processing machine, not shown.

In accordance with the present invention, in order to avoid an at least partial separation, the adhesive layer 6 is fastened in a positively engaging manner to the base member 1 and/or the graduation carrier 5.

Figure 2:
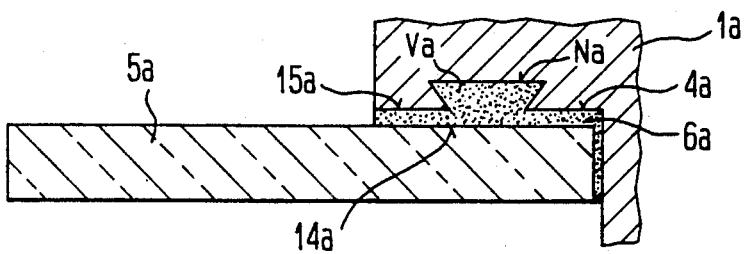
FIG. 2 is a cross-sectional view, on a larger scale, of a first scale of the length measuring device of FIG. 1.

FIG. 2 of the drawing is a cross-sectional view, on a larger scale, of a first scale of the length measuring device according to FIG. 1. The graduation carrier 5a with the graduation is fastened by means of the adhesive layer 6a to the contact surface 4a of the base member 1a which forms the housing. The base member 1a is of aluminum and the graduation carrier 5a of glass. While the adhesion of the adhesive layer 6a on the contact surface 14a of the graduation carrier 5a of glass is sufficient for a secure fastening, since the base member 1a is of aluminum, at least partial separations of the adhesive layer 6a from the contact surface 15a of the base member 1a may occur. In order to avoid such separations, the adhesive layer 6a engages by means of a projection Va into a recess Na in the form of a dovetail-shaped groove in the contact surface 15a of the base member 1a. This projection Va fills out the entire groove Na, so that a secure adhesion of the adhesive layer 6a to the contact surface 15a of the base member 1a is ensured.

Figure 3:
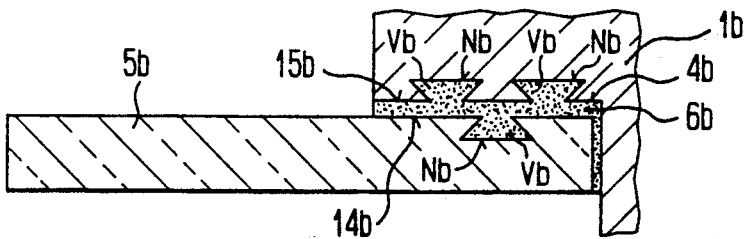
FIG. 3 is a cross-sectional view, on a larger scale, of a second scale of the length measuring device of FIG. 1.

FIG. 3 of the drawing is a cross-sectional view of a second scale in which the graduation carrier 5b with the graduation is fastened on the contact surface 4b of the base member 1b which forms the housing by means of the adhesive layer 6b. To avoid separations, the adhesive layer 6b engages with two projections Vb in two recesses Nb in the form of dovetail-shaped grooves in the contact surface 15b of the base member 1b and by means of a projection Vb in a recess Nb in the form of a dovetail-shaped groove in the contact surface 14b of the graduation carrier 5b. These projections Vb fill out the entire grooves, so that a secure adhesion of the adhesive layer 6b to the contact surface 15b of the base member 1b and to the contact surface 14b of the graduation carrier 5b is ensured.

Figure 4:
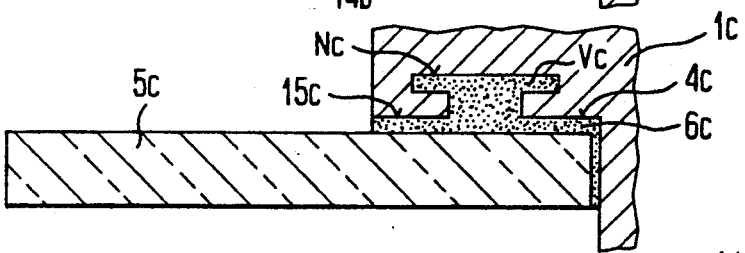
FIG. 4 is a cross-sectional view, on a larger scale, of a third scale of the length measuring device of FIG. 1.

FIG. 4 of the drawing is a cross-sectional view of a third scale in which the graduation carrier 5c with the graduation is fastened on the contact surface 4c of the base member 1c in the form of a housing by means of the adhesive layer 6c. In order to avoid separations, the adhesive layer 6c engages with a projection Vc in a recess Nc in the form of a T-shaped groove in the contact surface 15c of the base member 1c. The projection Vc fills out the entire groove Nc, so that a secure adhesion of the adhesive layer 6c to the contact surface 15c of the base member 1c is ensured.

Figure 5:
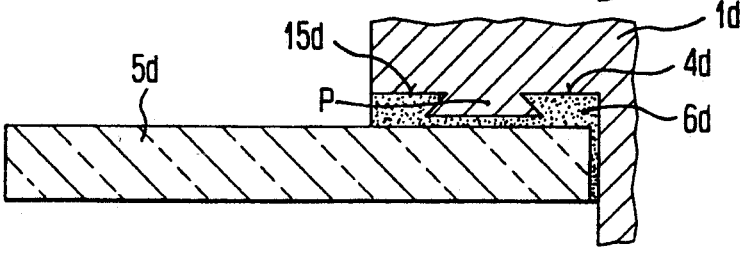
FIG. 5 is a cross-sectional view, on a larger scale, of a fourth scale of the length measuring device of FIG. 1.

FIG. 5 of the drawing is a cross-sectional view of a fourth scale in which the graduation carrier 5b with the graduation is fastened on the contact surface 4d of the base member 1d in the form of a housing by means of the adhesive layer 6d. In order to avoid separations, the adhesive layer 6d surrounds a dovetail-shaped projection P on the contact surface 15d of the base member 1d, so that a secure adhesion of the adhesive layer 6d to the contact surface 15b of the base member 1d is ensured.

The adhesive layer 6 preferably is of an elastic adhesive, for example, of silicone rubber. The at least one groove N may extend continuously in the region of the contact surface 14, 15 or partially, and the at least one groove N may extend in measuring direction and/or transversely of the measuring direction.

The cross-sectional areas of the recesses N or of the projections P of the base member 1 and/or of the graduation carrier 5 can of course be optionally selected. The important consideration is that an undercut is used to obtain a positively engaging fastening of the adhesive layer 6 to the contact surfaces 15, 14 of the base member 1 and/or of the graduation carrier 5.

Of course, the scale according to the present invention can also be used in an angle measuring device as it is described, for example, in German Auslegeschrift 28 41 501.

Contrary to the illustration of FIG. 1 of the drawing, the scale according to the present invention can also be used in an open, i.e., a non-enclosed measuring device.

Also, although not illustrated in the drawing, any combination of the above-described recesses and projections in the contact surfaces of the base member and/or the graduation carrier may be provided.

While specific embodiments of the invention have been shown and described in detail to illustrate the inventive principles, it will be understood that the invention may be embodied otherwise without departing from such principles.

I claim:

1. A scale comprising a base member and a graduation carrier with a graduation, wherein the graduation carrier is fastened on the base member by means of an adhesive layer, the adhesive layer being fastened by means of an undercut in a positively engaging manner to at least one of the base member and the graduation carrier so as to avoid separation, the adhesive layer having at least one projection which engages in a positively engaging manner in at least one recess of one of the base member and the graduation carrier, wherein the recess is a groove having a dovetail-shaped cross-section.

2. The scale according to claim 19, wherein the adhesive layer is of an elastic adhesive.

3. The scale according to claim 19, wherein the groove extends continuously at the contact surface of one of the base member and the graduation carrier.

4. The scale according to claim 19, wherein the groove extends partially over the contact surface of one of the base member and the graduation carrier.

5. The scale according to claim 19, wherein the groove extends in one of the measuring direction and transversely of the measuring direction.

6. A scale comprising a base member and a graduation carrier with a graduation, wherein the graduation carrier is fastened on the base member by means of an adhesive layer, the adhesive layer being fastened by means of an undercut in a positively engaging manner to at least one of the base member and the graduation carrier so as to avoid separation, the adhesive layer having at least one projection which engages in a positively engaging manner in at least one recess of one of the base member and the graduation carrier, wherein the recess is a groove having a T-shaped cross-section.

7. The scale according to claim 20, wherein the groove extends continuously at the contact surface of one of the base member and the graduation carrier.

8. The scale according to claim 20, wherein the groove extends partially over the contact surface of one of the base member and the graduation carrier.

9. The scale according to claim 20, wherein the groove extends in one of measuring direction and transversely of the measuring direction.

10. The scale according to claim 6, wherein the adhesive layer is of an elastic adhesive.

11. A scale comprising a base member and a graduation carrier with a graduation, wherein the graduation carrier is fastened on the base member by means of an adhesive layer, the adhesive layer being fastened by means of an undercut in a positively engaging manner to at least one of the base member and the graduation carrier so as to avoid separation, one of the base member and the graduation carrier having at least one projection, wherein the adhesive layer surrounds the projection in a positively engaging manner, and wherein the projection has a dovetail-shaped cross-section.

12. The scale according to claim 21, wherein the projection extends continuously at the contact surface of one of the base member and the graduation carrier.

13. The scale according to claim 21, wherein the projection extends partially over the contact surface of one of the base member and the graduation carrier.

14. The scale according to claim 21, wherein the projection extends in one of measuring direction and transversely of the measuring direction.

15. The scale according to claim 11, wherein the adhesive layer is of an elastic adhesive.

* * * * *